US009248789B2

(12) United States Patent
Quintero

(10) Patent No.: US 9,248,789 B2
(45) Date of Patent: Feb. 2, 2016

(54) METHOD AND APPARATUS FOR DETECTING KEY-ON AND KEY-OFF STATES USING TIME-TO-FREQUENCY TRANSFORMS

(71) Applicant: Verizon Patent and Licensing Inc., Basking Ridge, NJ (US)

(72) Inventor: Francisco Quintero, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 16 days.

(21) Appl. No.: 14/150,018

(22) Filed: Jan. 8, 2014

(65) Prior Publication Data

US 2015/0191138 A1    Jul. 9, 2015

(51) Int. Cl.
*G01M 17/00* (2006.01)
*G06F 7/00* (2006.01)
*B60R 16/023* (2006.01)

(52) U.S. Cl.
CPC ........ *B60R 16/0231* (2013.01); *B60W 2520/10* (2013.01)

(58) Field of Classification Search
CPC ........ G07C 5/00; G07C 5/006; G07C 5/0841; G07C 5/0816; B60W 2050/041
USPC .................................................. 701/39, 33.9
See application file for complete search history.

(56) References Cited

U.S. PATENT DOCUMENTS

| | | | | |
|---|---|---|---|---|
| 5,426,589 A | * | 6/1995 | Kitagawa et al. | 700/274 |
| 5,828,296 A | * | 10/1998 | Watanabe | 340/426.35 |
| 5,841,361 A | * | 11/1998 | Hoffman | 340/5.54 |
| 6,393,301 B1 | * | 5/2002 | Oda | 455/557 |
| 2005/0051136 A1 | | 3/2005 | Malaczynski et al. | |
| 2005/0212491 A1 | * | 9/2005 | Colombo et al. | 320/150 |
| 2007/0029986 A1 | * | 2/2007 | Nakamura et al. | 323/318 |
| 2008/0090133 A1 | * | 4/2008 | Lim et al. | 429/50 |
| 2009/0112392 A1 | * | 4/2009 | Buur et al. | 701/29 |
| 2013/0069761 A1 | | 3/2013 | Tieman | |

FOREIGN PATENT DOCUMENTS

WO    WO 2004005096 A1 *  1/2004

* cited by examiner

*Primary Examiner* — Behrang Badii
*Assistant Examiner* — Daniel L Greene

(57) ABSTRACT

A key state detector for a vehicle collects a sequence of battery voltage samples and applies a time-domain to frequency-domain transform (TFT) to the collected samples. The results of the TFT are then applied to an artificial neural network (ANN) to determine if they represent a key-on or key-off state. The ANN is trained based on data collected from the vehicle and is periodically retrained so that the detection of key-on and key-off states conforms to the particular vehicle and tracks the aging of vehicle components.

20 Claims, 7 Drawing Sheets

METHOD AND APPARATUS FOR DETECTING KEY-ON AND KEY-OFF STATES USING TIME-TO-FREQUENCY TRANSFORMS

BACKGROUND

Many vehicles are equipped with telematics systems that collect data on the operation of the vehicle and control functions of the vehicle in response to a signal from a remote device such as a central monitoring computer or a cellular phone. Examples of data collected include a history of the locations to which the vehicle has traveled and the current status of the vehicle. Examples of functions include locking or unlocking the vehicle doors, or starting the vehicle.

The telematics system of a vehicle may be enabled both when the vehicle is active (i.e. in a key-on state) or when the vehicle is inactive (i.e. in a key-off state). The power used by the telematics system when the vehicle is inactive is desirably much less than when it is active because, in the key-on state, the battery is typically charging while the battery is not charging when the vehicle is inactive, in the key-off state.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
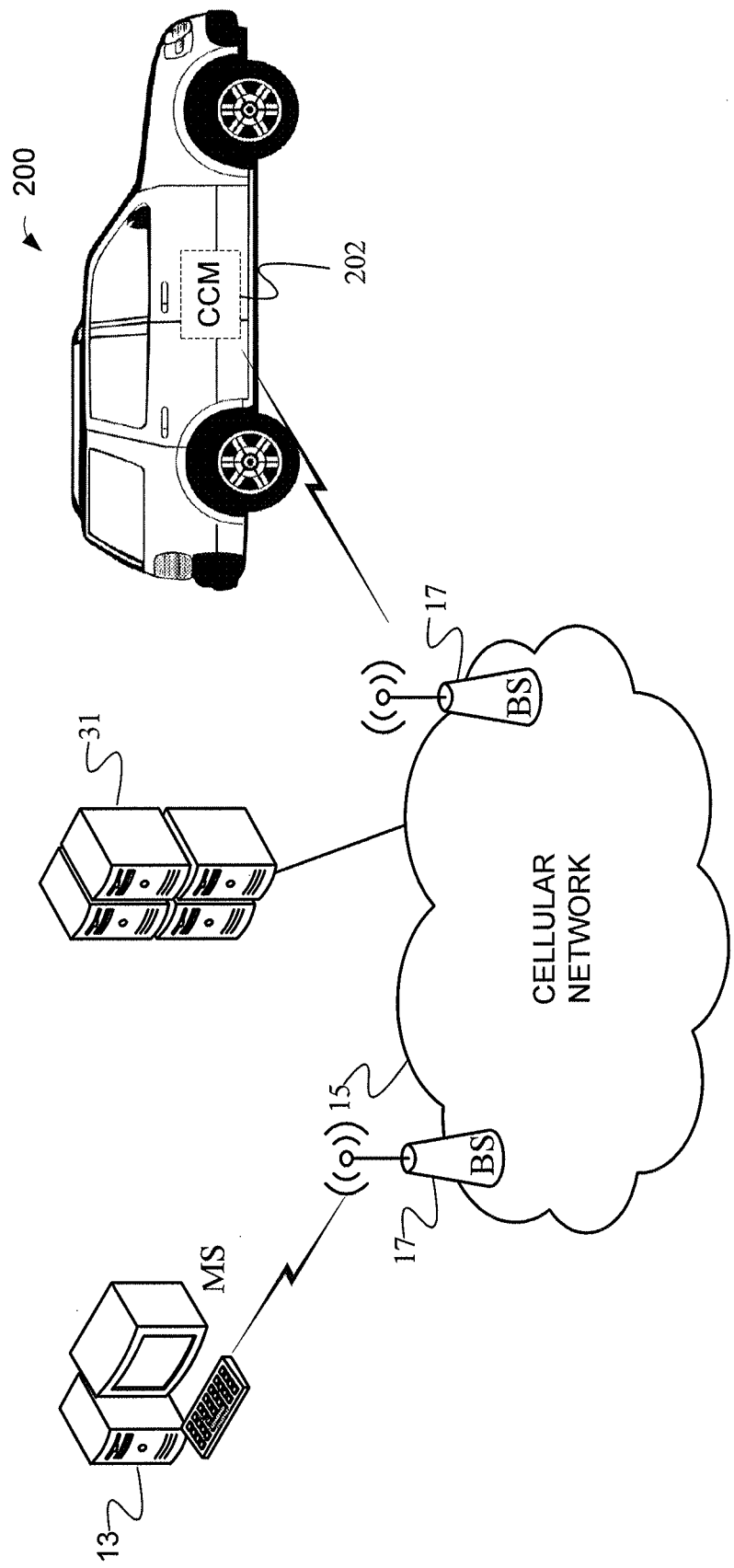
FIG. 1 is a block diagram illustrating an example system including a remote control device and a controlled vehicle.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In one implementation, the key-on and key-off status of a vehicle may be determined by monitoring the battery voltage using the on-board diagnostics (OBD) system. The OBD system provides information on vehicle status to a repairman or vehicle owner. This information typically includes coded values, some defined by the standard and others defined by the manufacturer. For current OBD systems, such as OBD II, the OBD connector is typically located in the passenger compartment within 0.6 meters (2 feet) of the steering wheel. The OBD system also provides the battery voltage and the chassis ground as two pins (pins 16 and 4, respectively) on the connector.

When the vehicle is inactive (in a key-off state) the voltage differential between these two pins may be a relatively low value (e.g. 12 v), corresponding to the nominal battery voltage. When the vehicle is active, however, this voltage may be a relatively high value (e.g. 14 v) because, when the vehicle is active, the battery is being charged at a voltage greater than the nominal battery voltage. Thus, the voltage differential measured between the battery pin and the chassis ground pin of the OBD connector may be used to determine whether the vehicle 200 is in a key-on or key-off state by comparing the measured differential to a threshold value. In one implementation, this differential may be measured periodically, for example at one-second intervals. A measurement sample having a value greater than the threshold when the vehicle is in a key-off state may indicate a key-on state while a sample less than the threshold when the vehicle is in a key-on state may indicate a key-off state.

The inventor has determined that these measured values may change over time due to a number of factors including aging of the battery, resulting in an increase in its internal resistance, aging the charging system or aging of the OBD connection to the battery or chassis ground. These changes may cause a decrease in the measured voltage and, thus, the failure to detect a key-on state. In addition, application of a large load, such as starting an air-conditioner compressor, when the vehicle is in an key-on state may cause a temporary drop in the sensed battery voltage, resulting in an erroneous key-off state.

The embodiments described below employ a different technique to determine whether a vehicle is in a key-on or key-off state. In one implementation, the system collects a sequence of samples of the battery voltage, selects a subset of samples in a window and applies a time-domain to frequency-domain transform (TFT) to the selected samples. The results of the TFT are then applied to an artificial neural network (ANN) to determine if they represent a key-on or key-off state. Examples of TFT's include, without limitation, a Fourier transform, a fast Fourier transform (FFT), a discrete cosine transform, (DCT), a wavelet transform, a discrete wavelet transform (DWT) and a Hadamard transform. The example ANN is trained based on data collected from the vehicle and is periodically retrained so that the detection of key-on and key-off states tracks changes in the vehicle components.

Reference now is made in detail to the examples illustrated in the accompanying drawings and discussed below. FIG. 1 illustrates an example environment in which the implementations operate. A vehicle 200 includes a vehicle telematics system such as a connected control module (CCM) 202. The CCM 202 communicates via a wireless network 15 with a central monitoring system (MS) 13 using base stations 17 of the network 15. The example network 15 may be an evolved packet network such as a 3G or 4G network including a server 31 (for example, a mobility management entity (MME) including a home subscriber service (HSS) database that contains user profile data. This data may be retrieved to indicate whether the CCM 202 is authorized to use the network and to determine whether the mobile device 13 is authorized to control the CCM 202.

Although the implementation shown in FIG. 1 is in the context of an evolved packet system, it is contemplated that other communication networks may be used, such as Global System for Mobile Communications (GSM) using General Packet Radio Services (GPRS) or Enhanced Data rates for GSM Evolution (EDGE). The communications network may also be a The Universal Mobile Telecommunications System (UMTS) network. Although the monitoring system 13 is shown as being connected to the network 15 via one of the base stations 17, it is contemplated that the monitoring system may have a wired or optical connection to the network. Although the monitoring system is shown as a generic computer, it is contemplated that it may be other kinds of data processing elements capable of communicating with the CCM 202 over the network, such as a mobile phone, a tablet computer or a personal digital assistant (PDA).

In one implementation, the monitoring system 13 includes a program that communicates with the CCM 202 via the network 15 to receive data from the CCM 202 and control the operation of the vehicle 200 using the CCM 202. For example, a user of the monitoring system 13 may remotely lock or unlock the vehicle, sound the horn or start the engine or determine the current location of the vehicle. The example program also allows monitoring personnel to remotely determine the status of the vehicle by reading and interpreting the status codes provided by the vehicles OBD system.

Figure 2:
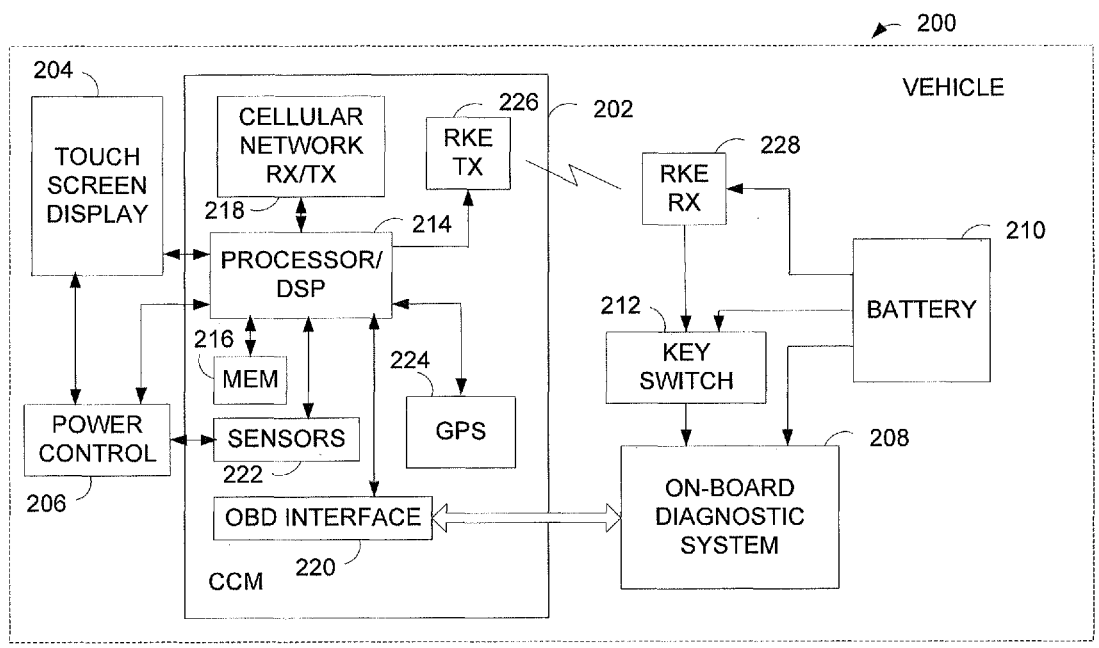
FIG. 2 is a block diagram of an example vehicle with a connected control module.

FIG. 2 is a block diagram of a vehicle 200 including an example CCM 202. As shown in FIG. 2, in addition to the CCM, the vehicle 200 may include a touch screen display 204 which is the user interface to the CCM 202, displaying data provided by, and accepting commands provided to the CCM 202. The vehicle 200 also includes power control module 206 that allows the CCM to control the application of operational power to elements of the vehicle that are associated with the CCM 202, for example, the touch-screen display. When the CCM 202 determines that the vehicle is in a key-on state, it causes the power control module 206 to turn-on the display 204. Similarly, when a key-off state is detected, the power control module 206 turns off the touch-screen display 204. In addition to the power control module 206, the example vehicle 200 includes an on-board diagnostic (OBD) system 208, a battery 210, a key switch 212 and a remote keyless entry (RKE) receiver 228.

The example CCM 220 includes a processor 214, which may include or be coupled to a digital signal processor (DSP), and a memory 216 that includes both program and data storage. The CCM also includes a cellular network transceiver 218, an OBD interface module 220, environmental sensors 222, a satellite positioning system SPS receiver, such as a Global Positioning System (GPS) receiver 224 and a RKE transmitter 226. In one implementation, the sensors 222 may include an accelerometer, a temperature sensor, and an electronic compass. The sensors may be micro-electromechanical sensor (MEMS) devices.

The RKE transmitter 226 may, for example, receive an unlock command from the monitoring system 13 via the network 15 and transceiver 218. The transmitter 226 relays the command to the RKE receiver 228, causing the receiver to operate the door locks of the vehicle. As shown in FIG. 2, the RKE receiver is also coupled to the key-switch 212, allowing the monitoring system to remotely start the vehicle. When the vehicle is started, using the key switch either by the driver or by a remote command, the key state of the vehicle changes from key-off to key-on.

In one implementation, the program controlling the processor 214 allows the operator of the vehicle 200 to retrieve and process data from the OBD 208 and to display the results of the processing on the display 204. The program may also allow the operator to access entertainment services, such as audio files, from a global information network (e.g. the Internet®) via the cellular transceiver 218. In addition, the program may integrate the GPS with map data obtained via the cellular network transceiver 218 and display the result on the display 214 to provide navigation assistance to the vehicle operator.

As described above, when the vehicle is active and a key-off state is detected, the CCM 202 removes power from the touch-screen display 204. It may also remove power from the GPS unit 224 and place the processor 214 in a standby mode such that the processor 214 transitions from the standby mode when a signal is received by the cellular network transceiver 218 or when a key-on state is detected.

In the example implementation described below, the CCM 202 uses an artificial neural network (ANN) to determine whether the vehicle is in a key-on or key-off state. The example neural network is trained based on data obtained from the vehicle. During an initial interval, key-on and key-off states are detected using the battery level threshold method, described above. During this interval, the CCM 202 obtains digital sample sets of the battery voltage and calculates a TFT for each sample set. The TFT features are extracted and combined with the determined key state to form a training set for the neural network. Multiple training sets are stored in a training memory and, when a sufficient number have been stored, they are used to train the ANN. After the neural network has been trained, the CCM 202 uses it to determine the key-on and key-off states. The neural network is retrained at intervals during the operation of the vehicle such that, as the vehicle electronic system changes, including the battery charging system and wiring, the neural network continues to properly detect key-on and key-off states.

Training the neural network based on data collected from the actual vehicle allows the system to automatically compensate for different types of vehicles, such as those using gas or diesel engines, electric motors or a hybrid gas and electric drive. The training procedure also allows the vehicle to compensate for manufacturing variations in a particular vehicle or vehicle type.

FIGS. 3, 4, 5 6A and 6B describe aspects of the programming of the processor 214 that concern the detection of key-on and key-off states. As described herein, CCM 202 may perform certain operations in response to processor/DSP 214 executing software instructions contained in a computer-readable medium, such as memory 216. The software instructions may be pre-programmed in a read-only memory (ROM) or may be read into memory 216 from another computer-readable medium or from another device via transceiver 218 or via another input/output port (not shown). The software instructions contained in memory 216 may cause processor 214 to perform one or more processes described herein. Alternatively, hardwired circuitry may be used in place of, or in combination with, software instructions to implement processes described herein. The hardwired circuitry may include, without limitation, custom circuitry, an application specific integrated circuit (ASIC) or a field-programmable gate array (FPGA). Thus, implementations described herein are not limited to any specific combination of hardware circuitry and software.

Figure 3:
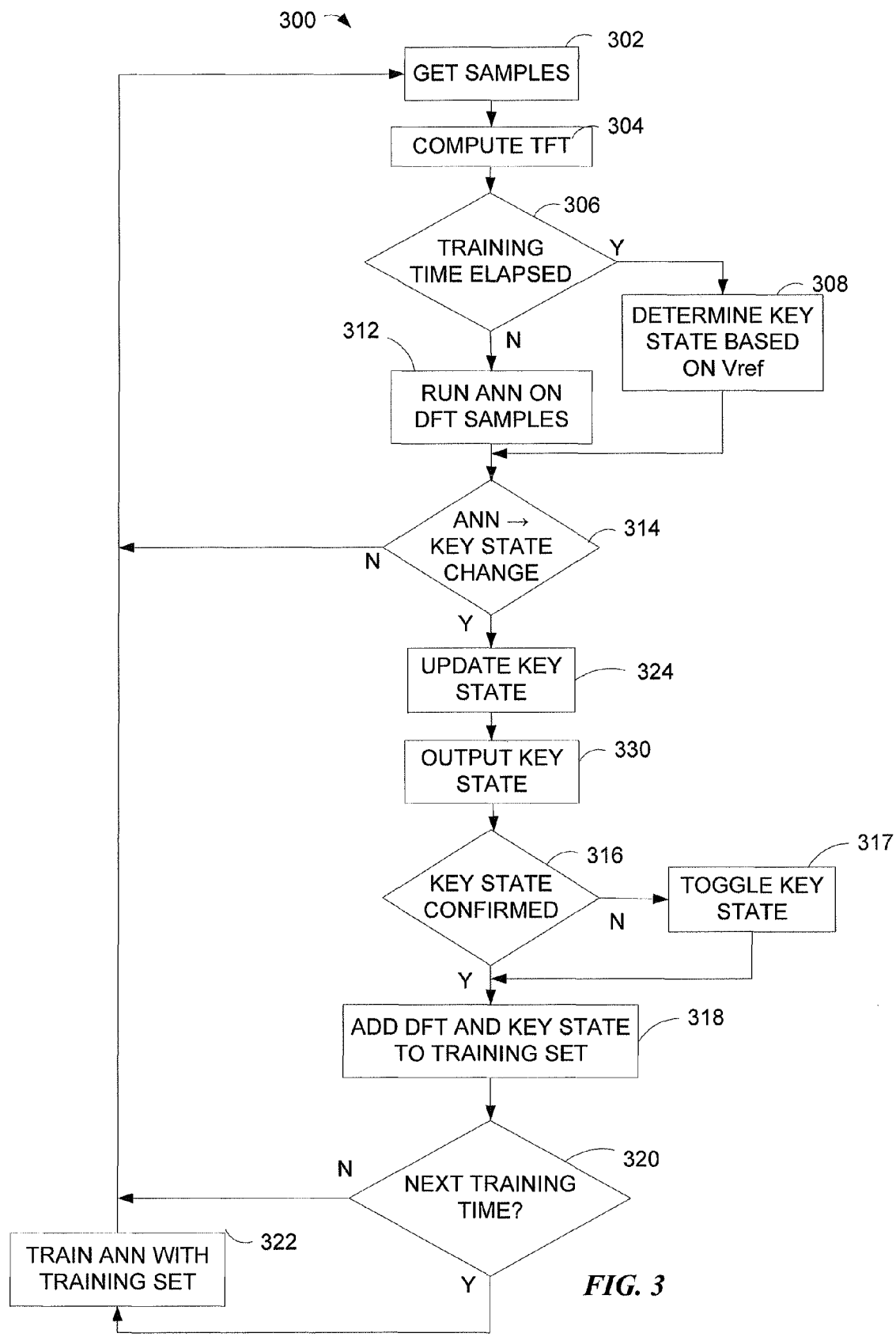
FIG. 3 is a flow-chart diagram of a method that is useful for describing the detection of a key-on or key-off state by the connected control module.
Figure 7A:
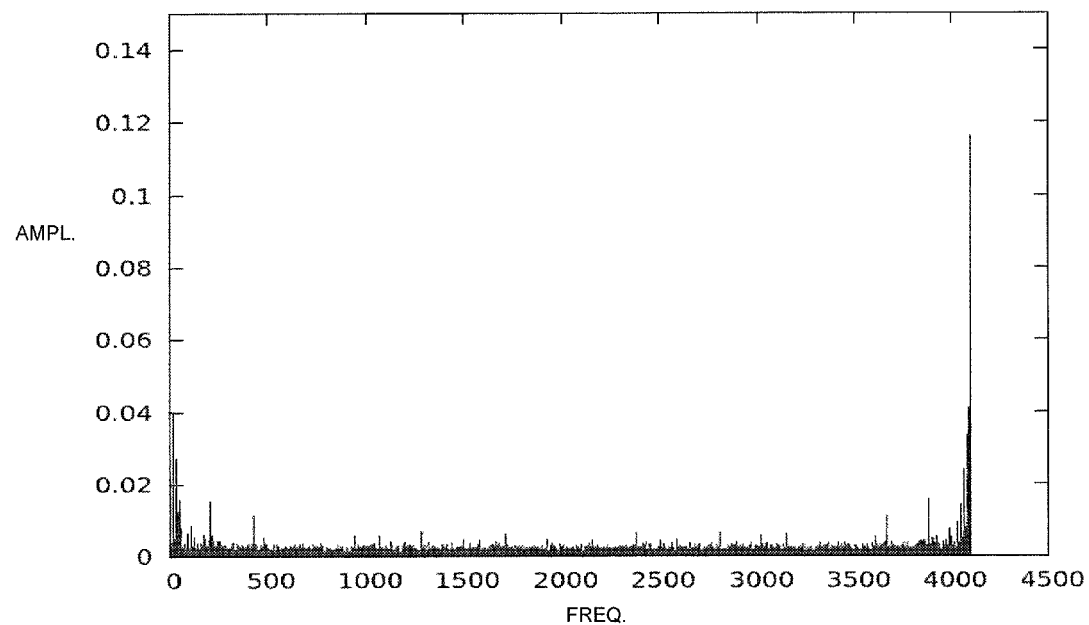
FIGS. 7A and 7B are graphs of amplitude versus frequency that are useful for describing the operation of the system shown in FIG. 2.
Figure 7B:
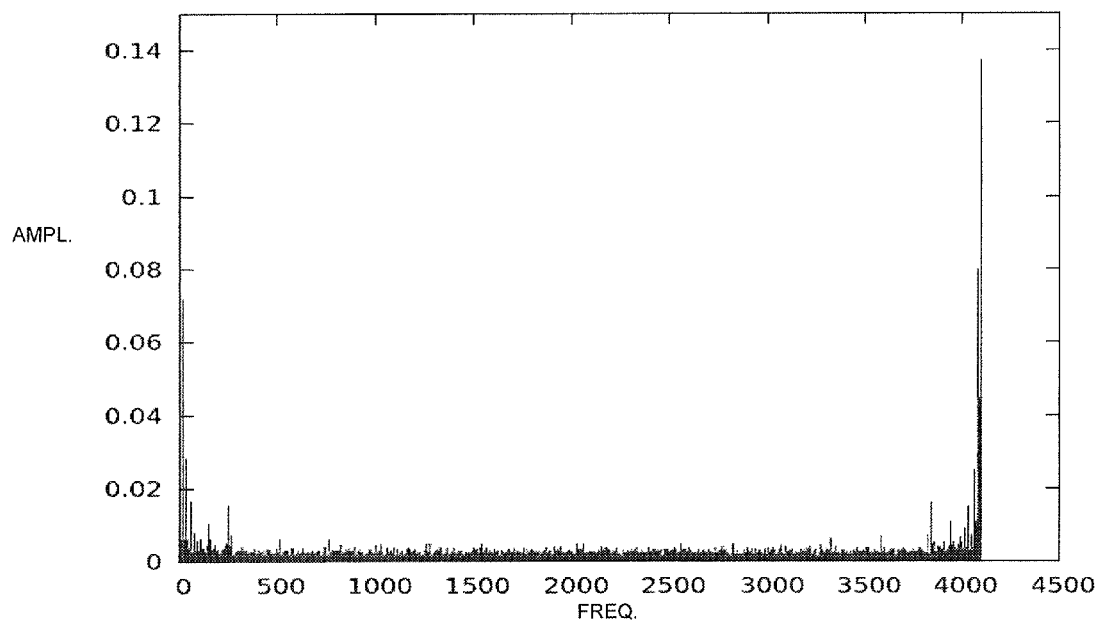

FIG. 3 is a flow-chart diagram of a process 300 that detects a change in the key state of the vehicle 200. The process begins by obtaining samples of the battery voltage (302). The number of samples and the length of the time period over which they are collected vary according to a number of factors. One factor is the time for the entire process to complete from the sample collection to detecting the key-on or key-off state. This time depends on the number of samples taken, the speed at which the processor 214 calculates the TFT and the speed at which the TFT can be processed by the artificial neural network (ANN) to determine whether the vehicle is in a key-on or key-off state. In one implementation, this time is between one and 10 seconds. In one implementation, between 1000 and 5000 samples of the battery voltage are taken at a sampling rate of between 10 KHz and 20 KHz to be processed by the TFT. After obtaining the samples, the process 300 computes the TFT (block 304). The output values provided by the TFT are a set of frequency bins, each bin representing a range of frequencies and having an amplitude. The amplitudes of the frequency bins are the TFT features that the ANN uses to differentiate between turn-on and turn-off states. Respective example turn-on and turn-off frequency distributions, are shown in FIGS. 7A and 7B. These example frequency distributions are calculated using a discrete Fourier transform. In both of these distributions, the direct current (DC) component is removed as it is much greater than any other frequency component.

In block 306 the process 300 determines if a sufficient number of samples have been collected to train the neural network. If a sufficient number of samples have not been collected, the process 300, at block 308, determines the key state (i.e. key-on or key-off) of the system using the threshold method, described above.

Figure 4:
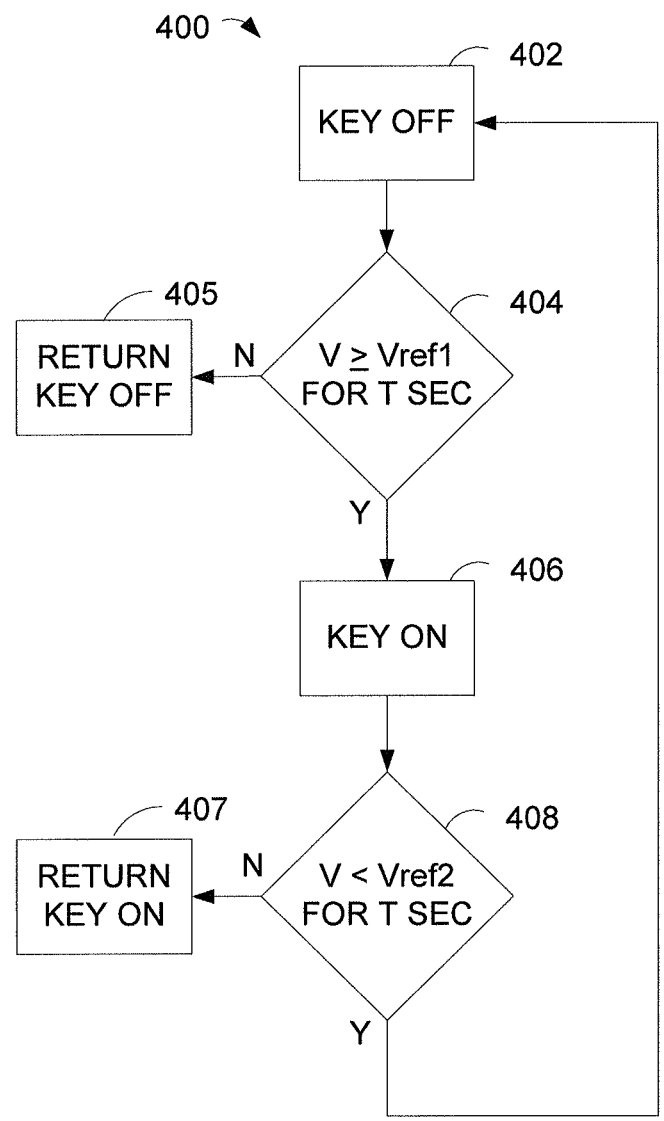
FIG. 4 is a flow-chart diagram of an alternative method for detecting key-on and key-off states that is used in the method shown in FIG. 3.

FIG. 4 is a flow-chart diagram of an example process 400 that determines the key state of the vehicle based on a threshold. If the current key state of the vehicle is key-off the process begins at block 402. If the current key state is key-on, the process begins at block 406. Assuming the current state is key-off, block 402 branches to block 404 which monitors the battery voltage for T seconds to determine if, during the T second interval, the battery voltage is ever greater than or equal to the reference voltage, Vref1. If it is not, then the key state of the vehicle is key-off and, at block 405, the process 400 returns the state as key-off. If the battery voltage is greater than Vref1, the vehicle 200 may have transitioned to a key-on state.

The process 400 executes block 406 if the current vehicle key state is key-on or if, at block 404, the process determined that a transition from the key-off state to the key-on state has occurred. Following block 406, the process 400 compares the battery voltage to Vref2 for T seconds to determine if, during the interval, the battery voltage is ever less than Vref2. If the battery voltage is ever less than Vref2, then the vehicle may have transitioned from the key-on state to the key-off state. In this instance, the process branches to block 402 to determine if this transition has occurred. If, however, at block 408, the battery voltage has been less than Vref2 for T seconds, the process 400 returns the key-on state at block 407. Thus, the example process 400 returns a key-state value only after the battery voltage remains in a key-on or a key-off state for at least T seconds. The values of T and Vref1 and Vref2 depend on the vehicle and the time to be used to determine the key state. T may range from 300 ms to 10 seconds and Vref1 and Vref2 may range from 12.5V to 13.8V. In one implementation, Vref1 and Vref2 have different values to provide hysteresis. In this implementation, Vref1 may range from 13.2 volts to 13.5 volts and Vref2 may range from 13.6 volts to 13.9 volts. Example values for Vref1 and Vref2 are 13.4 volts and 13.8 volts, respectively.

Referring to FIG. 3, if, at block 306, the process determines that the neural network has been trained at block 312, the process 300 applies the latest sample set to the ANN to determine the key state. The operation of the ANN is described below with reference to FIGS. 6A and 6B. After block 308 or block 312, the process, at block 314, determines if the key state has changed, that is to say if the key state determined in block 308 or 312 is not the same as the current key-state. This block may compare the newly-determined key state to a stored key state value for the vehicle. If the key state has not changed, then the block 314 branches to block 302 to obtain the next sample set. If the key state has changed, the process updates the key state at block 324. This block may store the newly-determined key state as the current key state for the vehicle. At block 330, the process 300 outputs the new key state. As described above, the CCM 212 applies power to certain devices, such as the touch screen display 204 and GPS 224 while in key-on state and removes power from these devices when in key-off state. In one implementation with reference to FIG. 2, the CCM 202 outputs the key state to the power control block 206 at block 330.

At block 316, the CCM confirms the changed key state. Block 316 may be executed between one second and 3 minutes after block 330 and is used to determine if the determined key-state change should be added to the training data for the ANN.

Figure 5:
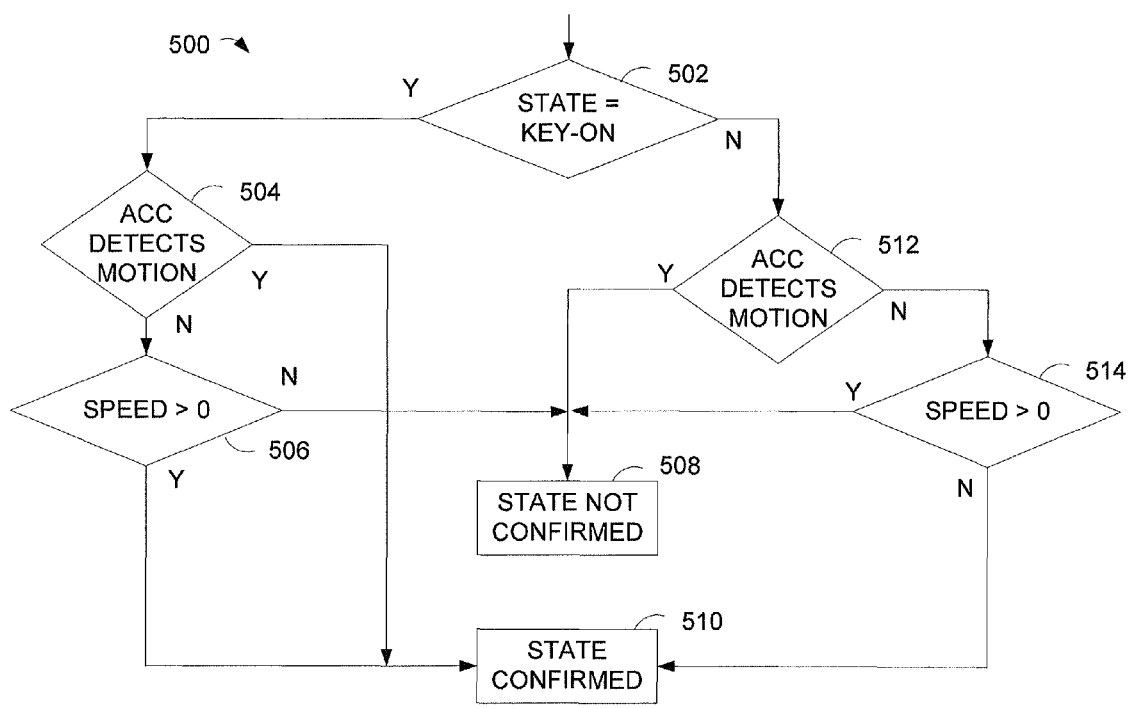
FIG. 5 is a flow-chart diagram of a method for confirming the key-on or key-off state of the vehicle that is used in the method shown in FIG. 3.

FIG. 5 is a flow-chart diagram of a process 500 that confirms the key state of the vehicle. At block 502, the process determines if the key state is key-on or key-off. If it is key-on, the process branches to block 504 to determine if the accelerometer in the sensors 222 of the CCM 202 has detected motion. If the key state of the vehicle is key-on, the accelerometer may sense vehicle motion as it accelerates upon being driven. If motion is detected at block 540, block 504 branches to block 510 and the key-on state is confirmed. If, however, no motion is detected at block 504, the process branches to block 506 to determine the speed of the vehicle. This step of the process may access speed data provided by the OBD or by obtaining successive position values from the GPS receiver 224. If the speed is determined to be greater than zero, then the key-on state is confirmed and the process branches to block 510. If, however, block 506 determines that the speed is not greater than zero, it branches to block 508 and the process 500 returns a value indicating that the current key-state is not confirmed. It is contemplated that, rather than using the accelerometer and the OBD 208, both movement and speed may be monitored using successive location values provided by the GPS receiver 224.

Returning to block 502, if the current key state is key-off, the process determines, in block 512 if the accelerometer has detected motion. If it has not, and, if at block 514, the process 500 determines from the data provided by the OBD 208 or GPS 224 that the speed is not greater than zero, then the key-off state is confirmed at block 510. If, however, either the accelerometer detects motion at block 510 or the OBD or GPS data indicates a non-zero speed at block 514, the key-off state is not confirmed at block 508.

Referring again to FIG. 3, after block 316, if the key-state is not confirmed, the process 300, at block 317, toggles the determined key state (i.e. changes key-on to key-off and vice versa) to be the confirmed key state and stores it with the TFT features in the training memory. This data represents an error in the ANN and is used to retrain it.

If block 316 confirms the key state, however, then the TFT data and the current key state are added to the set of training data used to train the ANN at block 318. After block 318, the process 300 determines that a sufficient number of feature sets have been collected to train the ANN. If a the amount of data is not sufficient, the process branches from block 320 to block 302 to obtain the next sample set. If, however, block 320 determines that it is time to train the ANN then the process branches to block 322 to performing the training operation. After block 322, the process branches to block 302 to obtain the next sample set.

Figure 6A:
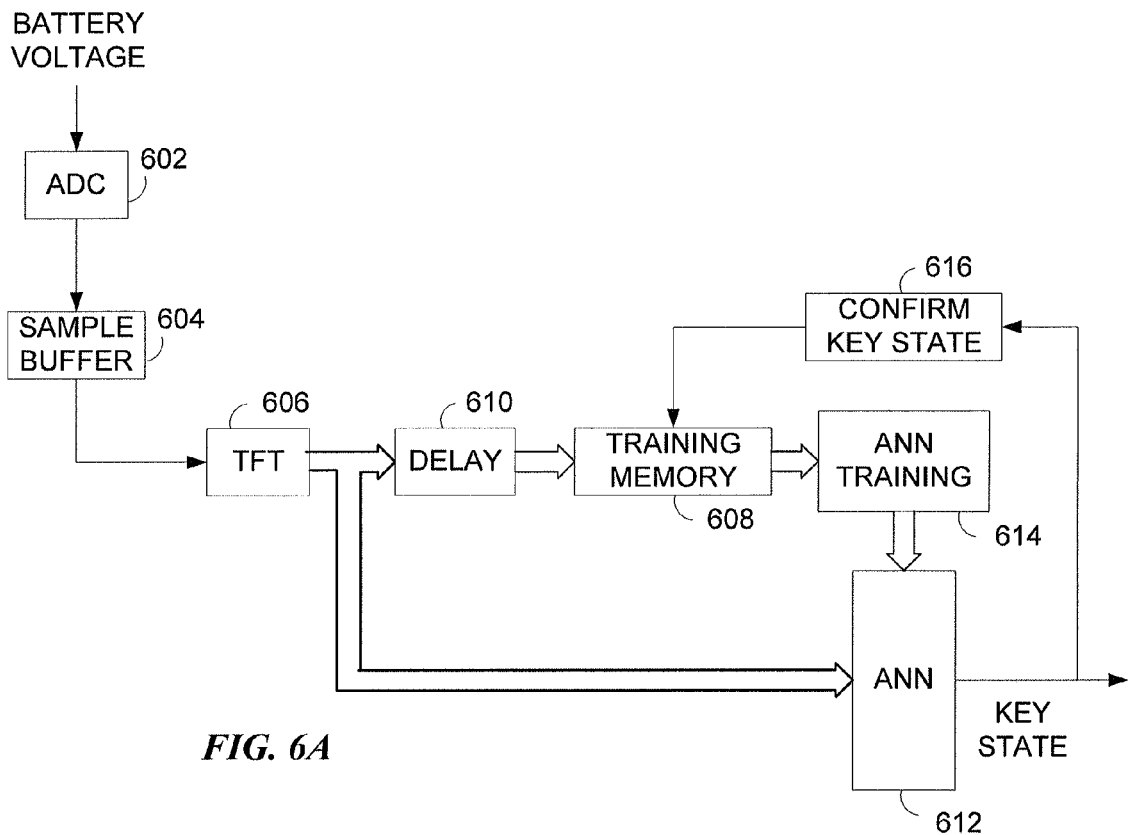
FIGS. 6A and 6B are functional block diagrams useful for describing the operation of a neural network, suitable for use in the connected control module, shown in FIG. 2.
Figure 6B:
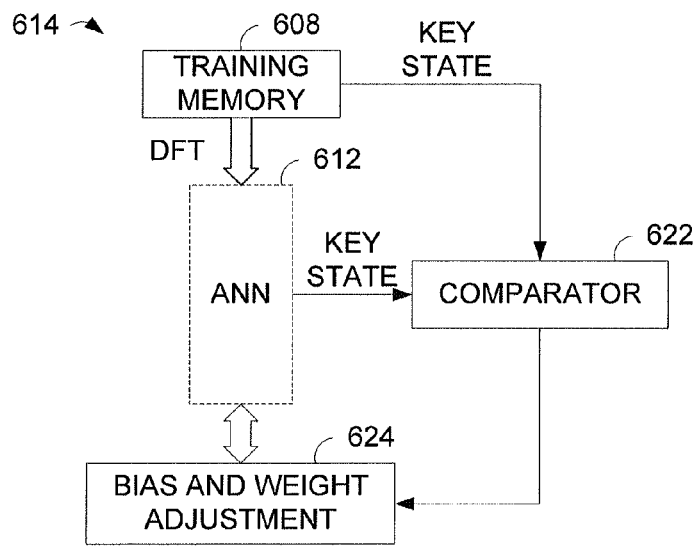

FIGS. 6A and 6B are block diagrams that are useful for describing the operation of the artificial neural network (ANN). While the ANN is shown as including components, it is contemplated that many of the blocks shown in FIGS. 6A and 6B may be implemented in software executing on a microprocessor, digital signal processor (DSP), dedicated circuitry or a combination of these elements. The ANN includes an analog-to-digital converter (ADC) 602 that digitizes the analog battery voltage provided by the OBD 208. The ADC is controlled to produce digital samples at a sampling rate over a sampling interval. As described above, the sampling rate may be between 10000 and 20000 samples per second. A total of 1000 to 5000 samples may be taken in each sample set and there may be an interval of 5 to 20 seconds between the start of each sampling interval.

The samples provided by the ADC 602 are stored in a sample buffer 604 until a complete set of samples have been captured. The system then calculates a time-domain to frequency-domain transform (TFT) on the sample set. The TFT converts the time-domain samples into values ad different frequencies in the frequency-domain. Examples of TFTs for key-on and key-off states are shown in FIGS. 7A and 7B, respectively. The TFT may provide 500 to 2500 frequency bins ranging from 2 Hz to 10 KHz.

In the example, the output values provided by the TFT 606 are applied to the ANN 612 and to a delay element 610. The delay element delays the storage of the TFT features in the training memory 608 until the corresponding key-state has been determined and confirmed. Alternatively, the ANN may store the TFT features without delay and propagate a pointer to their location in the memory while the ANN 612 determines the key state and the key state is confirmed in block 616. As described above, if block 616 does not confirm the key state determined by the ANN, the key state is toggled to correct it. The key state provided by block 616 is then stored in the training memory 608 with the TFT features that the ANN used to generate it.

The example ANN 612 is a one hidden layer feed-forward network. Each frequency bin of the TFT output is an input to the ANN 612. The output signal provided by the ANN 612 is a single Boolean value indicating whether the key state is key-on or key-off. An ANN is a nonlinear analytical model that is used to classify data inputs. The ANN 612 comprises a set of digital signal processing algorithms which are trained to classify the sets of TFT output values as representing either a key-on or key-off state.

The training of the ANN uses the training memory 608 and the training process 614. The example memory 608 may include between 30 and 80 megabytes (MB) of storage. Details of the training process 614 are shown in FIG. 6B. Each element of the ANN includes a coefficient and a bias that change the output value provided by a respective one of the processing elements. The outputs of the processing elements are combined to produce the ANN output signal. The operation of the ANN is controlled by an error function that is dynamically generated from the data. The training data includes the TFT output values as well as the confirmed key-state. These are stored in the training memory 608. During the training operation, the TFT output values from the memory 608 are applied to the ANN 612 and the output value produced by the ANN 612 is applied to a comparator 622. If the key-state value provided by the ANN 622 matches the confirmed key-state value corresponding to the TFT feature set, no action is taken. If, however, these values are different, then the TFT features and the confirmed key state are applied to the bias and weight (coefficient) adjustment block 624 to change the coefficients of the ANN in a direction that reduces the error in the predicted key state. Because the weights and biases of the ANN 612 are adjusted to minimize the number of erroneous predictions made by the ANN, the training data automatically cause the weights and biases to adjust the model in a manner that produces the correct result.

As described above, the ANN 612 is periodically trained based on recorded TFT output values and corresponding confirmed key states. Thus, as the characteristics of the battery, alternator, charging circuitry and wiring of the vehicle age, the CCM 202 is able to accurately determine the key state of the vehicle. The interval between retraining the ANN may be between 100 and 400 hours of operation (when the vehicle is in both a key-off and a key-on state). A fixed-size set of training data may be used for each training, such that the newer data overwrites the older data allowing the system to respond to changes that may affect key-state determination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    collecting, by a processor, a sequence of battery voltage samples for a vehicle,
        the collected sequence of battery voltage samples being stored in a memory associated with the processor;
    calculating, by the processor, a time-domain to frequency-domain transform (TFT) for the collected sequence of battery voltage samples to produce a set of frequency domain features; and
    causing, by the processor, a key state of the vehicle to be determined using the set of frequency domain features, the key state indicating whether the vehicle is active or whether the vehicle is inactive.

2. The method of claim 1, wherein causing the key state of the vehicle to be determined includes applying the set of frequency domain features to an artificial neural network (ANN) to determine the key state of the vehicle,
    the method further comprising:
        for a particular number of key-state determinations prior to applying the set of frequency domain features to the ANN to determine the key state:
            determining the key state of the vehicle by comparing a battery voltage to a threshold;
            collecting a first sequence of battery voltage samples for the vehicle;
            calculating the TFT for the collected first sequence of battery voltage samples to produce a first set of frequency domain features; and
            storing the first set of frequency domain features with respective determined key state as training data; and
        after the particular number of key state determinations, training the ANN using the training data.

3. The method of claim 1, wherein calculating the TFT includes calculating at least one of a Fourier transform, a fast Fourier transform (FFT), a wavelet transform, a discrete wavelet transform (DWT), a discrete cosine transform (DCT) or a Hadamard transform.

4. The method of claim 1, wherein causing the key state of the vehicle to be determined includes applying the set of frequency domain features to an artificial neural network (ANN) to determine the key state of the vehicle,
    the method further comprising:
        confirming that the key state, determined by the ANN, is correct by monitoring at least one of a movement of the vehicle or a speed of the vehicle; and
        when the key state is not confirmed, toggling the key state.

5. The method of claim 4, wherein confirming the key state includes:
    confirming the key state by monitoring the movement of the vehicle using an accelerometer or by monitoring the speed of the vehicle using a signal provided by an on-board diagnostic (OBD) system of the vehicle.

6. The method of claim 4, wherein the key state is confirmed by monitoring the movement and the speed of the vehicle using a Global Positioning System receiver.

7. The method of claim 4, further comprising:
    storing, as training data, each set of frequency domain features and a respective determined key state; and
    training the ANN using the training data after a particular amount of training data has been stored.

8. The method of claim 7, wherein the ANN is a one hidden layer feed-forward network, and
    wherein training the data includes:
        applying the training data to the ANN, and
        adjusting coefficients and biases of the ANN based on the applied training data to reduce differences between key states detected by the ANN and the respective determined key state.

9. A system comprising:
    an analog-to-digital converter (ADC) to sample a battery voltage of a vehicle at particular intervals to collect respective sets of digitized battery voltage samples;
    a memory coupled to the ADC to store the collected respective sets of digitized battery voltage samples; and
    a processor configured to:
        calculate a time-domain to frequency-domain transform (TFT) for each set of digitized battery voltage samples, of the collected respective sets of digitized battery voltage samples, to produce respective sets of frequency domain features, and
        cause a key state of the vehicle to be determined using the respective sets of frequency domain features, the key state indicating whether the vehicle is active or whether the vehicle is inactive.

10. The system of claim 9, wherein, when causing the key state of the vehicle to be determined, the processor is to cause an artificial neural network (ANN), coupled to the processor, to sequentially process the respective sets of frequency domain features to determine the key state of the vehicle, and
    wherein the processor is further configured to:
        prior to causing the ANN to sequentially process the respective sets of frequency domain features to determine the key state:
            determine the key state of the vehicle by comparing a battery voltage to a threshold;
            collect a first sequence of battery voltage samples for the vehicle;
            calculate the TFT for the collected first sequence of battery voltage samples to produce a first set of frequency domain features; and
            store the first set of frequency domain features with a respective determined key state as training data in another memory; and
    wherein the processor is configured to train the ANN using the training data after a particular amount of training data has been stored.

11. The system of claim 9, further including:
    an accelerometer; and
    a satellite positioning system (SPS) receiver;
    wherein, when causing the key state of the vehicle to be determined, the processor is to cause an artificial neural network (ANN), coupled to the processor, to sequentially process the respective sets of frequency domain features to determine the key state of the vehicle;
    wherein the processor is further configured to:

confirm that each key state, determined by the ANN, is correct by monitoring at least one of a movement or a speed of the vehicle using at least one of the accelerometer or the SPS receiver, and when the key state is not confirmed, toggle the key state.

12. The system of claim 11, wherein, when calculating the TFT, the processor is configured to calculate at least one of a Fourier transform, a fast Fourier transform (FFT), a wavelet transform, a discrete wavelet transform (DWT), a discrete cosine transform (DCT) or a Hadamard transform.

13. The system of claim 11, further comprising:

another memory, coupled to the processor, to store, as training data, each set of frequency domain features and a respective determined key state for each confirmed key state, wherein the processor is configured to train the ANN using the training data after a particular amount of training data has been stored.

14. The system of claim 13, wherein the ANN is a one hidden layer feed-forward network, and wherein the processor is configured to:
apply the training data to the ANN, and
adjust coefficients and biases of the ANN responsive to the applied training data.

15. A non-transitory computer readable medium storing instructions, the instructions comprising:

one or more instructions which, when executed by a processor, cause flail the processor to:
collect a plurality of sets of battery voltage samples for a vehicle,
the collected plurality of sets of battery voltage samples being stored in a memory associated with the processor;
calculate, for each set of battery voltage samples of the collected plurality of sets of battery voltage samples, a time-domain to frequency-domain transform (TFT) to produce a respective set of frequency domain features; and
cause a key state of the vehicle to be determined using the respective set of frequency domain features,
the key state indicating whether the vehicle is active or whether the vehicle is inactive.

16. The non-transitory computer readable medium of claim 15, wherein the one or more instructions to cause the key state of the vehicle to be determined include one or more instructions to apply the respective set of frequency domain features to an artificial neural network (ANN) to determine the key state of the vehicle, and wherein the instructions further comprise:
one or more instructions which, when executed by the processor, cause the processor to:
confirm that the key state, determined by the ANN, is correct by monitoring at least one of a or a speed of the vehicle; and
when the key state is not confirmed, toggle the key state.

17. The non-transitory computer readable medium of claim of claim 15, wherein the one or more instructions to cause the key state of the vehicle to be determined include one or more instructions to apply the respective set of frequency domain features to an artificial neural network (ANN) to determine the key state of the vehicle, wherein the instructions further comprise:
one or more instructions which, when executed by the processor, cause the processor to:
determine the key state of the vehicle by comparing a battery voltage to a threshold, prior to applying the respective set of frequency domain features to the ANN;
collect a first sequence of battery voltage samples for the vehicle prior to applying the respective set of frequency domain features to the ANN;
calculate the TFT for the collected first sequence of battery voltage samples to produce a first set of frequency domain features prior to applying the respective set of frequency domain features to the ANN;
store the first set of frequency domain features with respective determined key state as training data prior to applying the respective set of frequency domain features to the ANN; and
train the ANN using the training data.

18. The non-transitory computer readable medium of claim 15, wherein the one or more instructions to calculate the TFT include one or more instructions which, when executed by the processor, cause the processor to calculate at least one of a Fourier transform, a fast Fourier transform (FFT), a wavelet transform, a discrete wavelet transform (DWT), a discrete cosine transform (DCT) or a Hadamard transform.

19. The non-transitory computer readable medium of claim 15, wherein the one or more instructions to cause the key state of the vehicle to be determined include one or more instructions to apply the respective set of frequency domain features to an artificial neural network (ANN) to determine the key state of the vehicle, and wherein the instructions further comprise:
one or more instructions which, when executed by the processor, cause the processor to:
store, as training data, each set of frequency domain features and a respective determined key state; and
train the ANN using the training data after a particular amount of training data has been stored.

20. The non-transitory computer readable medium of claim 19, wherein the instructions further comprise one or more instructions which, when executed by the processor, cause the processor to implement the ANN as a one hidden layer feed-forward network.

* * * * *